(12) United States Patent
Liu et al.

(10) Patent No.: US 7,434,153 B2
(45) Date of Patent: Oct. 7, 2008

(54) SYSTEMS AND METHODS FOR AUTHORING A MEDIA PRESENTATION

(75) Inventors: Qiong Liu, Milpitas, CA (US); Donald Kimber, Foster City, CA (US); Patrick Chiu, Menlo Park, CA (US); Surapong Lertsithichai, Mountain View, CA (US); Chunyuan Liao, Adelphi, MD (US); Hangjin Zhang, Goleta, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 460 days.

(21) Appl. No.: 10/760,671

(22) Filed: Jan. 21, 2004

(65) Prior Publication Data

US 2005/0160368 A1    Jul. 21, 2005

(51) Int. Cl.
*G06F 17/00* (2006.01)
*G06F 17/20* (2006.01)

(52) U.S. Cl. ..................................... 715/200
(58) Field of Classification Search ................. 715/500, 715/706, 501.1, 500.1; 709/204
See application file for complete search history.

(56) References Cited

U.S. PATENT DOCUMENTS

| | | | | |
|---|---|---|---|---|
| 5,307,456 A | * | 4/1994 | MacKay | 715/782 |
| 5,717,879 A | * | 2/1998 | Moran et al. | 715/716 |
| 6,084,590 A | * | 7/2000 | Robotham et al. | 345/419 |
| 6,160,907 A | * | 12/2000 | Robotham et al. | 382/154 |
| 6,386,985 B1 | * | 5/2002 | Rackham | 472/75 |
| 6,595,781 B2 | * | 7/2003 | Sutton | 434/276 |
| 6,907,563 B1 | * | 6/2005 | Kumar et al. | 715/501.1 |
| 2004/0001106 A1 | * | 1/2004 | Deutscher et al. | 345/838 |
| 2004/0039934 A1 | * | 2/2004 | Land et al. | 713/200 |
| 2004/0128350 A1 | * | 7/2004 | Topfl et al. | 709/204 |

OTHER PUBLICATIONS

Slater et al.; "Acting in Virtual Reality"; ACM; 2000; pp. 103-110.*
Hirata et al.,:Conenten-orented Integration in Hypermedia Systems, 1996, ACM, pp. 11-21.*
Naef et al.,"Spatialized Audio Rendering for Immersive Virtual Environments",ACM, 2002, pp. 65-72.*
Gong, Fengmin, "Multipoint Audio and Video Control For Packet-Based Multimedia Conferencing", 1994, ACM, pp. 425-432.*
Wojciechowski et al.,"Building Virtual and Augmented Reality Museum Exhibitions", ACM, 2004, pp. 135-144.*

(Continued)

*Primary Examiner*—Doug Hutton
*Assistant Examiner*—James J Debrow
(74) *Attorney, Agent, or Firm*—Sughrue Mion, PLLC

(57) ABSTRACT

A system and method for authoring a media presentation including a media presentation environment representation having a portion defined as a hot spot associated with a media presentation device. Various embodiments include a hyperslide listing portion, a media presentation authoring portion, and/or a media presentation device listing portion. Various embodiments include an integrated presentation authoring preview environment. The method includes selecting a physical device for a presentation unit in the media presentation environment, manipulating a visual representation of the presentation unit, recording a display of the presentation unit, and previewing the presentation in an augmented reality environment, a virtual reality environment, or both. Various embodiments operate with a plurality of types of media presentation devices and a plurality of each type of device.

32 Claims, 10 Drawing Sheets

OTHER PUBLICATIONS

"Showflow Integrated Show Control and Playback System," MediaMation Incorporated, Show Control & Multi Media Systems, pp. 1-45, Sep. 13, 2000.

"Showcase Graphic Editing Software for ShowFlow Script Creation," MediaMation Incorporated, Show Control & MultiMedia Systems, pp. 1-50, Oct. 17, 2002.

"Understanding the Power of Director, Macromedia—Director : Understanding the Power of Director, http://www.macromedia.com/software/director/resources/understanding/," pp. 1-2, 2003.

"Theme Park Control Systems, ThemeParks—Control Systems, http://www.mkpe.com/theme_parks/control.htm," pp. 1-3, Sep. 17, 2000.

"Overview of Producer, http://www.Microsoft.com/office/powerpoint/producer/overview.asp," pp. 1-3, Aug. 3, 2002.

"Impact Engine, http://www.archive.org/web/20020609051907/www.impactengine.com/examples_casestudies_ent.asp," pp. 1-3, Jun. 9, 2000.

"Presenting Keynote., Apple—Keynote, http://www.apple.com/keynote," pp. 1-4, 2003.

"Amazing World, Make your Home a part of the Family," Amazing Controls, 2001.

"Batalpha, batalpha—Figaro Software, http://www.batalpha.com/prodkt/en/product_figaro_software.shtml," pp. 1-2, Publication date Unknown.

* cited by examiner

SYSTEMS AND METHODS FOR AUTHORING A MEDIA PRESENTATION

BACKGROUND OF THE INVENTION

1. Field of Invention

This invention relates to systems and methods for authoring a media presentation.

2. Description of Related Art

Tools used to author media presentations are available in the commercial marketplace. One popular tool available for authoring a media presentation is PowerPoint by Microsoft. PowerPoint organizes presentations by a sequence of slides, and supports text editing, figure drawing, audio and video embedding, and slide animation. Furthermore, Microsoft Producer enables a synchronization of sequence of PowerPoint slides with audiovisual streams and images to produce an on-demand media presentation. Competitors of Microsoft, including Apple, Macromedia, and Impact Engine, also market similar products. Some other commercially available media presentation products embed related media presentation links in a video stream. Examples of companies marketing such products include Digital Design Works and VideoClix.

A variety of theater automation software interfaces are also available in the commercial marketplace. An example of a theater automation software interface currently available in the commercial marketplace is Batalpha's Figaro software.

SUMMARY OF THE INVENTION

Many media presentation authoring products in the commercial marketplace are developed based on a model that supports only one two-dimensional display and only one audio loud speaker. This assumption is a significant limitation when an environment has more than one two-dimensional display, more than one loudspeaker, or controllable devices other than displays and speakers. Thus, these media presentation authoring products in the commercial marketplace are inadequate for authoring media presentations in a media-device distributed environment.

Many existing presentation authoring tools are unable to recognize various device locations and make use of that information. Thus, they cannot efficiently use multiple presentation channels, such as multiple displays and loudspeakers. The main drawback of many media presentation authoring products in the commercial marketplace is that they are either unable to support media presentation authoring based on locations of multimedia devices or unable to coordinate the use of multiple presentation devices, such as lights, multiple displays, multiple loudspeakers, a printer, a sprinkler, a fan, or other sort of articulators.

Even though Batalpha's Figaro Software has the ability to assist theater customization, they do not provide users GUIs depicting a presentation environment with hot-spots for referring to presentation devices in that environment. These kinds of software are good for professionals, who are very familiar with their working environments, to create complex motion sequences. However, they are not suitable for an ordinary user who is not familiar with a presentation environment.

As multimedia devices become more affordable, more devices will be installed in media presentation environment. Thus, it is beneficial when presentation authoring tools support presentation customization for various media-device distributed environments.

Most commercially available media presentation authoring products require a user to prepare each media presentation based on a conservative one-display-and-one-loudspeaker model. Therefore, outputs for various media devices have to be separately prepared.

Some media presentation products require users using specific equipment, such as a specific pointer or touch screen, to move slides from display to display. Most media presentation authoring products do not have a model of a media presentation environment. Furthermore, most commercially available media presentation authoring products do not support moving slides from one device to another. Most commercially available media presentation authoring products are unable to customize presentations for various components within a specific media presentation environment.

Most commercially available media presentation authoring products cannot support the volume control of a loud speaker, or a loud speaker's on/off function, or the magnitude of a light, or a light's on/off function. Likewise, some media presentation authoring products, such as ModSlideShow, require a media presentation presenter to remember every aspect of the entire presentation well in order to effectively relocate any component of the presentation while the presentation is in progress.

For at least the foregoing reasons, most commercially available media presentation authoring products are ill suited for a typical user to customize a presentation that uses many media devices in an unfamiliar environment.

This invention provides systems and methods for authoring a media presentation that efficiently use multiple devices.

This invention separably provides systems and methods for authoring a media presentation that is well suited for a user that is less than thoroughly familiar with a given media presentation.

This invention separably provides systems and methods for authoring a media presentation that includes a plurality of image screens.

This invention separably provides systems and methods for authoring a media presentation that considers the location of a loud speaker.

This invention separably provides systems and methods for authoring a media presentation that controls a plurality of loud speakers.

This invention separably provides systems and methods for authoring a media presentation that controls whether a loud speaker is on or off.

This invention separably provides systems and methods for authoring a media presentation that controls a light.

This invention separably provides systems and methods for authoring a media presentation that controls the magnitude of a light.

This invention separably provides systems and methods for authoring a media presentation that controls whether a light is on or off.

This invention separably provides systems and methods for authoring a media presentation that includes a model of the presentation environment.

This invention separably provides systems and methods for authoring media presentations wherein two or more representations of a media presentation environment are different.

This invention separably provides systems and methods for authoring a media presentation including a representation of each element of the media presentation.

This invention separably provides systems and methods for authoring a media presentation wherein any element of the presentation can be relocated within the presentation through the use of a graphical user interface.

This invention separably provides systems and methods for authoring a media presentation wherein a representation of the presentation environment is alterable.

This invention separably provides systems and methods for authoring a media presentation that provides a user with a reference to a plurality of available media presentation devices.

This invention separably provides systems and methods for authoring a media presentation wherein a representation of an available media device is an image within a model of the presentation environment.

This invention separably provides systems and methods for authoring a media presentation wherein a user selects a media device by actuating an image or model of the device.

This invention separably provides systems and methods for authoring a media presentation wherein a user is able to customize the output of a selected media device.

This invention separably provides systems and methods for authoring a media presentation wherein every media device available in the presentation environment is controlled.

This invention separably provides systems and methods for authoring a media presentation wherein alterations are available to accommodate newly developed media devices and advances in existing media devices.

This invention separably provides systems and methods for authoring a media presentation wherein a user is provided with a graphical user interface depicting a presentation environment with hot-spots that refer to presentation devices in the presentation environment.

This invention separably provides systems and methods for authoring a media presentation that manage output sequences corresponding to a plurality of output devices, thus creating a media presentation sequence for each of a plurality of media presentation devices and synchronizing all of the media presentation sequences during a playback or preview of the media presentation.

This invention separably provides systems and methods for authoring a media presentation that manage a multiple channel media presentation.

Various exemplary embodiments of the systems and methods for authoring a media presentation according to this invention include a media presentation environment representation having a hot spot associated with a particular media presentation device.

Various exemplary embodiments of the systems and methods for authoring a media presentation according to this invention include a media presentation environment representation portion, a hyper-slide listing portion, a media presentation-component time relation portion and a media presentation device listing portion.

In various exemplary embodiments of the systems and methods for authoring a media presentation according to this invention, a physical device for a presentation unit in a media presentation environment representation is selected, a visual representation of the presentation unit is manipulated, a display of the presentation unit is recorded in a storage medium, and the presentation is previewed. In various exemplary embodiments, the presentation is previewed in an augmented reality environment, a virtual reality environment, or a combination of these environments.

These and other features and advantages of this invention are described in or are apparent from the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF PREFERRED EMBODIMENTS

The following detailed description of various exemplary embodiments of the media presentation authoring systems and methods according to this invention may refer to one or more specific types of media presentation authoring systems and methods, for the sake of clarity. However, it should be appreciated that the principles of this invention as outlined and/or discussed below, can be equally applied to any known or later-developed media presentation authoring system or method.

Figure 1:
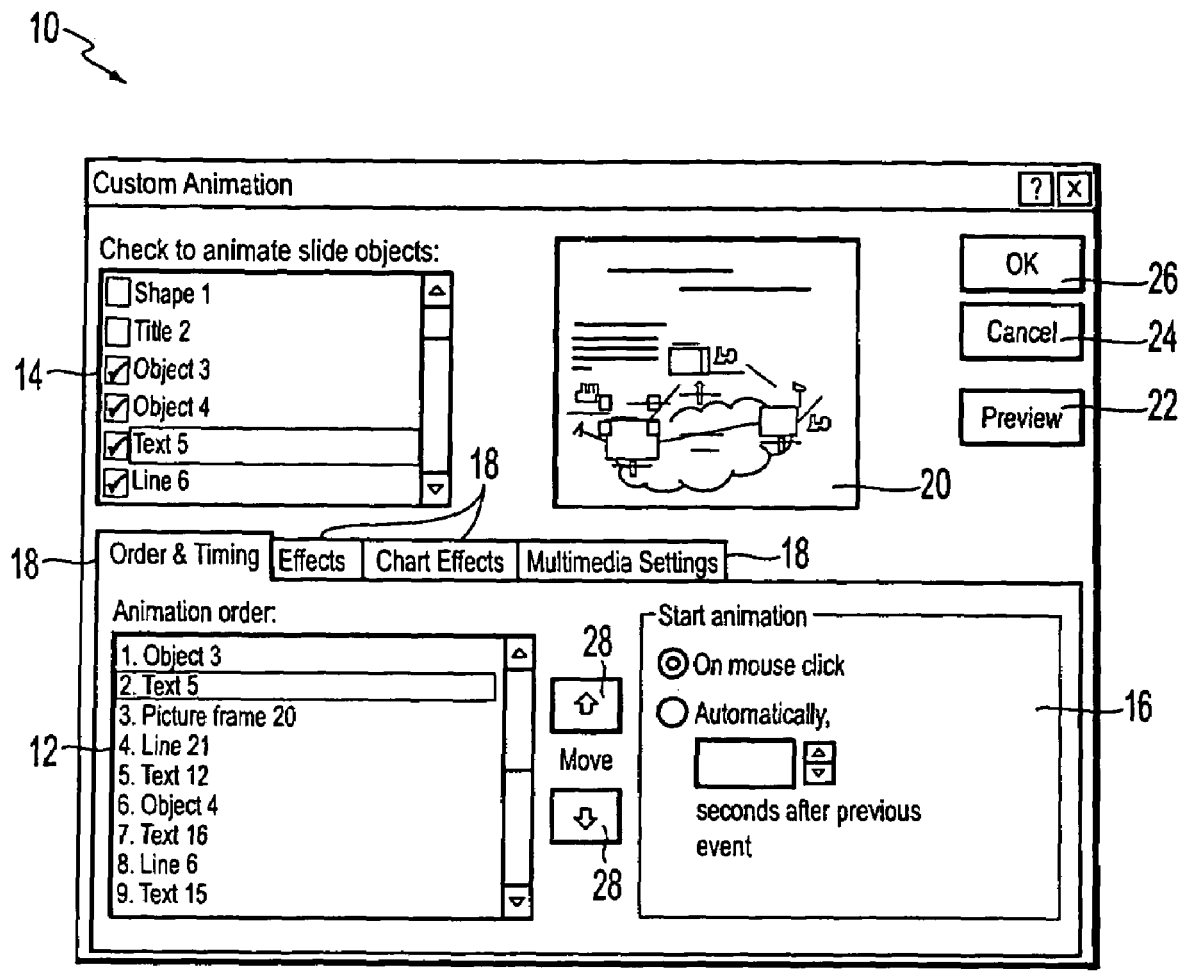
FIG. 1 is a schematic diagram of a commercially available media presentation authoring interface.

FIG. 1 is a schematic diagram of a commercially available media presentation authoring interface 10. As shown in FIG. 1, the media presentation authoring interface 10 includes an animation order and timing widget portion 12, an animation slide object listing and selecting widget portion 14, a start animation widget portion 16, several control tabs 18, including a control tab 18 that corresponds to the animation order and timing widget portion 12, a slide object preview portion 20, a preview activation widget portion 22, a cancellation widget portion 24, and an activation selection widget portion 26. The animation slide object listing and selecting widget portion 14 is used to select slide objects and to animate slide objects. The animation order and timing widget portion 12 is used to control the order and timing of animation slide objects in the presentation. The animation order and timing widget portion 12 is displayed upon selecting the control tab 18 labeled "Order & Timing". The order of an animation unit is rearranged within a slide by moving a selected animation object earlier or later in the presentation using widgets 28.

The start animation widget portion 16 is used to control the way that animation is started. Other control tabs 18 are used to control other aspects of a media presentation such as effects, chart effects and multimedia settings.

The slide object preview portion 20 displays a preview of the content of a slide object selected in the animation slide object listing and selecting widget portion 14. The preview activation widget portion 22 is used to activate a preview of a slide, including any effects or animation associated with that slide.

The cancellation widget portion 24 is used to cancel any changes made in the media presentation authoring interface 10. Similarly, the activation selection widget portion 26 is used to accept all changes made in the media presentation authoring interface 10.

The media presentation authoring interface 10 is not able to use multiple presentation channels, such as multiple displays and loudspeakers. Thus, the media presentation authoring interface 10 is not able to support media presentation authoring based on locations of a plurality of multimedia devices. Likewise, the media presentation authoring interface 10 is unable to coordinate the use of multiple types of presentation devices, such as lights, multiple displays, multiple loudspeakers, a printer, a fan, a sprinkler, a fan, or other sort of articulators.

Figure 2:
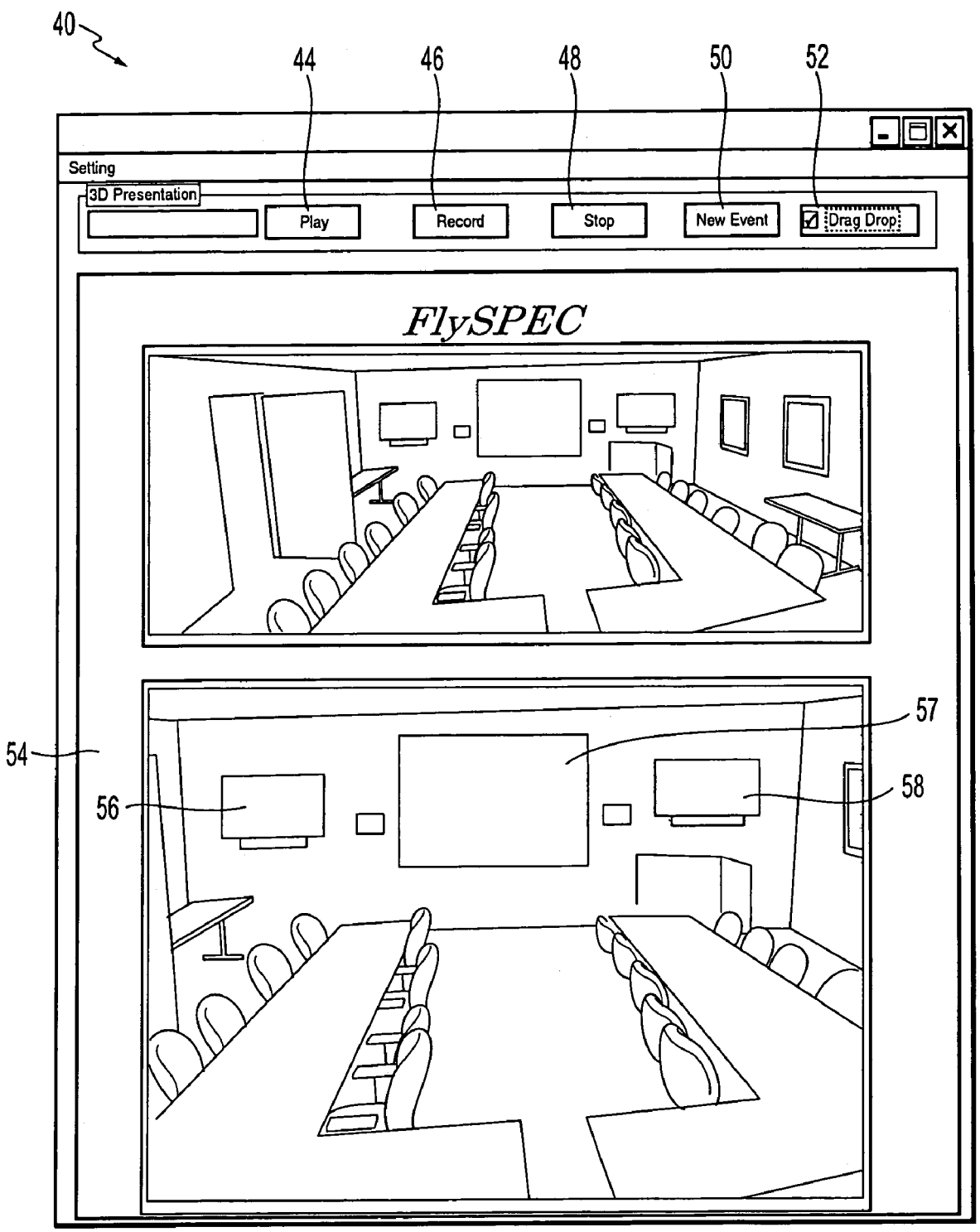
FIG. 2 is a schematic diagram of one exemplary embodiment of a media presentation authoring interface according to this invention.

FIG. 2 is a schematic diagram of one exemplary embodiment of a media presentation authoring interface 40 according to this invention. The media presentation authoring interface 40 includes a play widget 44, a record widget 46, a stop widget 48, a new event widget 50, a drag drop widget 52, and a presentation environment representation portion 54.

In various exemplary embodiments, the media presentation authoring interface 40 authors, prepares, or creates one or more hyper-slides. A hyper-slide is any coarse media presentation unit. A hyper-slide is an extension to a regular slide: It is a basic media presentation unit that represents any form of media used in any media presentation. Thus, in various exemplary embodiments, a hyper-slide represents a visual slide, an image, a video segment or clip, an audio segment, a streaming video or audio signal from a live camera or microphone, a light adjustment action or command, a loud speaker adjustment action or command, or any other media form or sort of media action desired to be made during a media presentation. The light adjustment and loud speaker adjustment actions include adjustments in the volume or intensity of the light or the loud speaker, or an action to turn the light or loud speaker on or off. Various exemplary embodiments discussed within include other types of hyper-slides, including, for example, various functions associated with various articulators. Thus, a hyper-slide is an input source or an object that is to be rendered or completed by a media presentation device.

In various exemplary embodiments, the media presentation authoring interface 40 is used to edit hyper-slides, to record a play list of hyper-slides (i.e., record one or more hyper-slides), and/or to play one or more hyper-slides. In various exemplary embodiments, the record widget 46 is actuated to begin recording a play list of hyper-slides. In various exemplary embodiments, a hyper-slide is played by dragging the hyper-slide from the computer desktop (e.g. a file management window) to a portion of an associated media presentation device represented in the media presentation environment representation portion 54.

Thus, in various exemplary embodiments of the systems and methods according to this invention, a video segment hyper-slide is played by dragging the identified video segment hyper-slide from, for example, a file management window on a computer desktop to a video presentation screen depicted in the media presentation environment representation portion 54. In various exemplary embodiments of the systems and methods for authoring a media presentation according to this invention, a video segment hyper-slide is displayed on one or more video screens 56, 58, and 60. In various exemplary embodiments of the systems and methods for authoring a media presentation according to this invention, the video screens 56, 58, and 60, are shown within the media presentation environment representation portion 54.

It should be appreciated that, in various exemplary embodiments of the systems and methods for authoring a media presentation according to this invention, any type of media in a hyper-slide is played by dragging an identification of that hyper-slide from, for example, a file management window on a computer desktop to a portion of the media presentation environment representation portion 54 corresponding to a media device that plays, performs, or displays the action or content associated with the identified hyper-slide.

In various exemplary embodiments of the systems and methods for authoring a media presentation according to this invention, when it is desirable to record a new event in a separate hyper-slide, the new event widget 50 is actuated. After actuating the new event widget 50, in various exemplary embodiments of this invention, a hyper-slide is then edited and saved.

In various exemplary embodiments of this invention, the stop widget 48 is actuated to conclude a hyper-slide play list recording session. Likewise, in various exemplary embodiments of this invention, the play widget 44 is actuated to play back a recorded sequence of hyper-slides previously recorded according to a desired hyper-slide play list.

Thus, the media presentation authoring interface 40 represents one embodiment of an augmented reality interface for authoring and previewing a media presentation.

Figure 3:
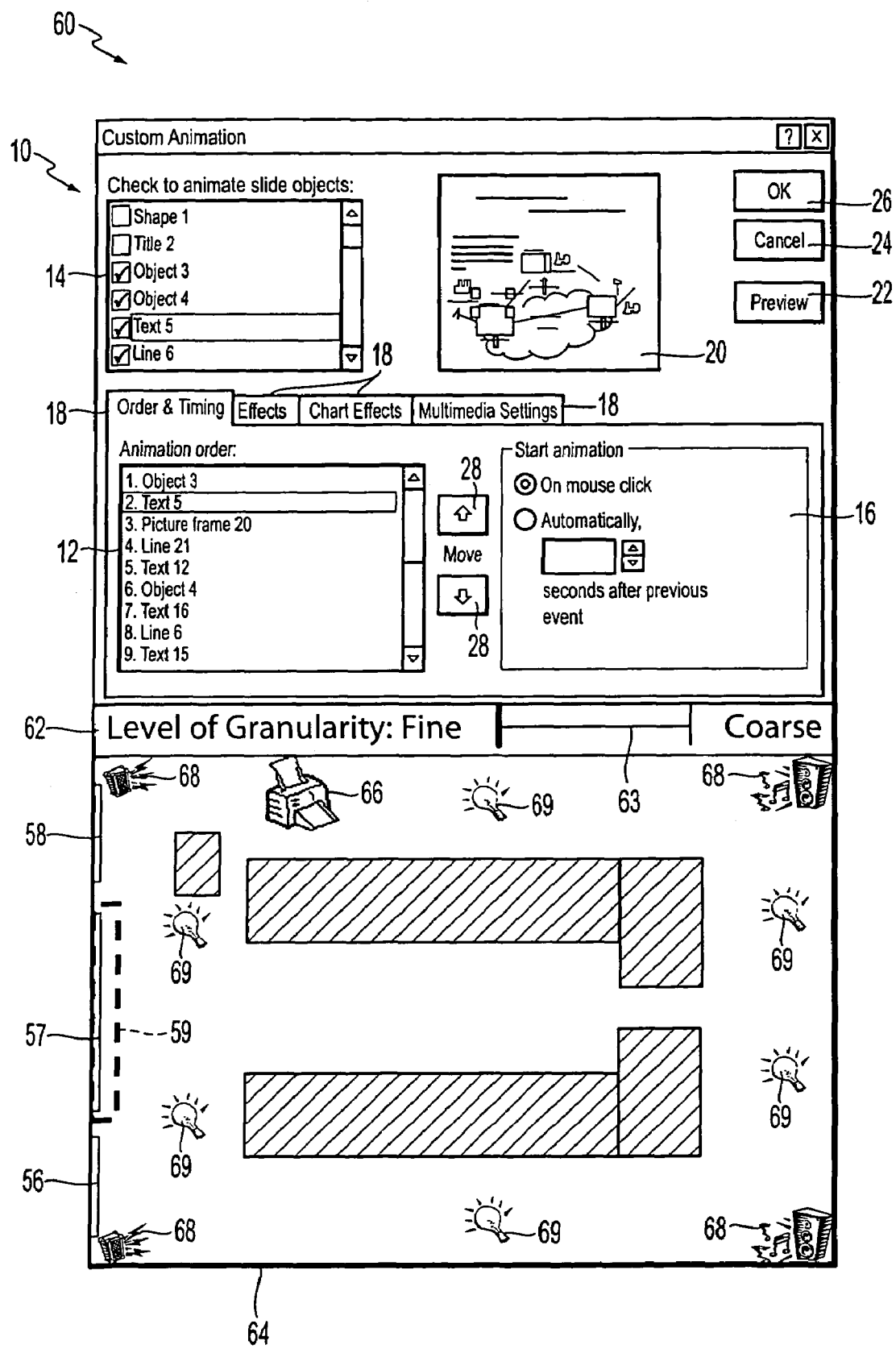
FIG. 3 is a schematic diagram of a second exemplary embodiment of a media presentation authoring interface according to this invention.

FIG. 3 is a schematic diagram of a second exemplary embodiment of a media presentation authoring interface according to this invention. The media presentation authoring interface 60 includes a level of granularity selecting portion 62 and a media presentation environment representation portion 64. Some of the elements in this figure are commonly numbered with elements previously discussed in connection with other figures. A duplicative discussion of those elements is omitted for the sake of simplicity.

The media presentation environment depicted in the media presentation environment representation portion 64 corresponds to the media presentation environment depicted in the media presentation environment representation portion 54. However, the media presentation environment depicted in the media presentation environment representation portion 54 includes a pictorial representation of the media presentation environment. In various exemplary embodiments of the systems and methods for authoring a media presentation according to this invention, a media presentation environment representation is included where the media presentation environment representation is a pictorial representation of the media presentation environment. The media presentation environment representation portion 64 includes a diagrammatic representation of the media presentation environment. In various exemplary embodiments of the systems and methods for authoring a media presentation according to this invention, a media presentation environment representation is included where the media presentation environment representation is a diagrammatic representation of the media presentation environment.

The diagrammatic media presentation environment depicted in the media presentation environment representation portion 64 includes video screens 56, 57, and 58, a printer 66, loud speakers 68, and lights 69.

The media presentation environment depicted in the media presentation environment representation portion 64 includes four loud speakers 68, one printer 66, six lights 69 and three video screens 56, 57 and 58. It should be apparent that the media presentation environment depicted in the media presentation environment representation portion 64 corresponds to one very specific embodiment of a media presentation environment, and that a large number of variations in the media presentation environment are possible by varying the number and/or the location and/or the presence or absence of any given type of media presentation device, whether currently known or later developed. Thus, it should be apparent that many media presentation environments contain a plurality of different types of media presentation devices. It should similarly be apparent that many media presentation environments contain a plurality of any given type of media presentation device. Thus, the media presentation environment depicted in the media presentation environment representation portion 64 is representative of a multitude of varying media presentation environments.

In various exemplary embodiments of the systems and methods for authoring a media presentation according to this invention, the media presentation interface 60 is designed as a pop-up dialog box for an integrated presentation authoring tool. It should be apparent that, in various exemplary embodiments of this invention, the media presentation interface 60 is displayed to a user by any known or later-developed means of displaying a graphical user interface.

The diagrammatic media presentation environment depicted in the media presentation environment representation portion 64 is a two-dimensional representation of an exemplary media presentation environment. The media presentation environment depicted in the media presentation environment representation portion 54 is a three-dimensional representation of the same exemplary media presentation environment. In various exemplary embodiments of this invention, a media presentation environment representation is included that depicts a two-dimensional representation of the media presentation environment. In various exemplary embodiments of this invention, a media presentation environment representation is included that depicts a three-dimensional representation of the media presentation environment. In various exemplary embodiments of this invention, one or more media presentation environment representations are included where the media presentation environment is depicted as a combination of two-dimensional and three-dimensional representations of various portions of the media presentation environment.

In various exemplary embodiments of this invention, the media presentation interface 60 is activated by selecting an indicator corresponding to the media presentation interface 60. Thus, in various exemplary embodiments of this invention, the media presentation interface 60 is activated by selecting a label from a pull-down menu. In various exemplary embodiments of this invention, the user activates media presentation interface 60 by selecting a "custom animation" label on a pull-down menu.

In various exemplary embodiments of this invention, a current hyper-slide is displayed in the hyper-slide representation portion 20.

In various exemplary embodiments of this invention, a level of granularity selecting portion 62 is included. In the media presentation interface 60 the level of granularity selecting portion 62 is located between the media presentation environment representation portion 64 and an upper portion corresponding to the media presentation authoring interface 10. In various exemplary embodiments of this invention, the level of granularity selecting portion 62 is situated in a different location within the media presentation interface 60.

In various exemplary embodiments, the level of granularity selecting portion 62 includes a level of granularity selecting widget 63. In various exemplary embodiments, the level of granularity selecting widget is a bar. In various exemplary embodiments of this invention, the level of granularity selecting widget 63 takes any known or later-developed form of a graphical user interface for launching an event such as selecting a level of granularity.

The level of granularity corresponds to the level of detail displayed regarding the content of the media presentation. Thus, in various exemplary embodiments, a coarse level of granularity corresponds to a list of hyper-slides in the media presentation, and a fine level of granularity corresponds to all presentation units, such as a text box, a title, or an embedded object, and lists the order of such media animation units. In various exemplary embodiments of this invention, the level of granularity selecting portion 62 includes a label or labels to describe the level or levels of granularity. In various exemplary embodiments, the level of granularity selecting portion 62 includes the labels "Fine" and "Coarse" to describe the level of granularity. In various exemplary embodiments, the level of granularity selecting widget 63 is able to select more than two levels of granularity.

In various exemplary embodiments where more than two levels of granularity are able to be selected, the level of detail in each level of granularity between one extreme and the other is between the two extremes in level of granularity previously described. Thus, in various exemplary embodiments, one level of granularity corresponds to a display of all hyper-slides in the presentation in a list in one graphical user interface, and an animation order of the hyper-slides listed in a separate graphical user interface. In various exemplary embodiments, the order of the media animation units, and other properties of the media animation units, is modified by varying a selection with the level of granularity selecting widget 63.

Further details of additional aspects of the exemplary embodiment shown in FIG. 3 will be discussed below in connection with FIG. 4.

Figure 4:
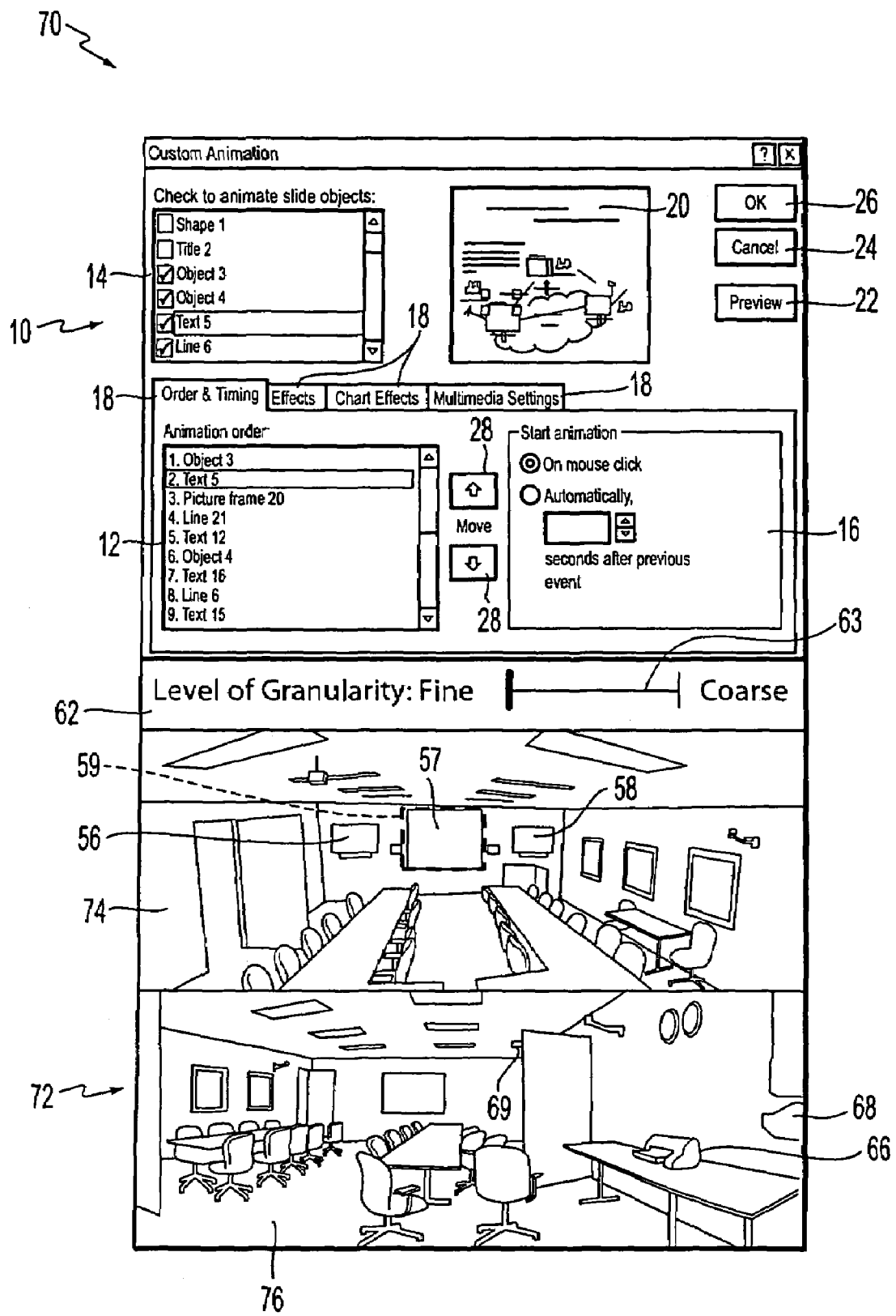
FIG. 4 is a schematic diagram of a third exemplary embodiment of a media presentation authoring interface according to this invention.

FIG. 4 is a schematic diagram of a third exemplary embodiment of a media presentation authoring interface according to this invention. Some of the elements in this figure are commonly numbered with elements previously discussed in connection with other figures. A duplicative discussion of those elements is omitted for the sake of simplicity.

FIG. 4 depicts a media presentation authoring interface 70 that includes a media presentation environment representation portion 72. The media presentation environment representation portion 72 is a multi-view pictorial representation of the media presentation environment. The media presentation environment representation portion 72 includes a representation of a front of the media presentation environment 74 and a representation of the rear of the media presentation environment 76. In various exemplary embodiments, a three-dimensional representation of the media presentation environment is included wherein the representation is subdivided into a representation of a front portion of the media presentation environment and a rear portion of the media presentation environment. In various exemplary embodiments, a three-dimensional representation of the media presentation environment is included wherein the representation is subdivided into a representation of a plurality of portions of the media presentation environment.

The media presentation interfaces 60 and 70 present a user with a representation of a media presentation environment in portions 64 and 76 that contains actual information regarding an actual media presentation environment. Thus, in various exemplary embodiments of the systems and methods for authoring a media presentation according to this invention, a media presentation interface is included with a media presentation environment representation that corresponds to an actual environment where a media presentation will be given.

In various exemplary embodiments of the systems and methods for authoring a media presentation according to this invention, a user uses a media presentation interface such as, for example, the media presentation interfaces 60 or 70, to define a temporal relation, an effect, and/or another feature of various media presentation units. In various exemplary embodiments of the systems and methods for authoring a media presentation according to this invention, a media presentation unit is edited with an interface customized for that media presentation. Thus, in various exemplary embodiments, a media presentation device serving as a presentation unit is selected in some manner.

In the embodiments depicted in FIGS. 3 and 4, the large central video screen 57 is selectable in connection with a hot-spot 59. The hot-spot 59 is a portion of the graphical user interface. A hot-spot is defined as a visual representation of an output device. In various exemplary embodiments, the output device is a display, a loud speaker, a printer, a light, a fan, or any of the other embodiments of a media presentation device mentioned herein, otherwise currently known, or later developed. A hot-spot, such as the exemplary hot-spot 59, is useful for users to refer to various devices distributed in the presentation environment.

In various exemplary embodiments, the hot-spot is indicated within a dashed line. However, as will be described below, in various exemplary embodiments a dashed line has a somewhat different, but corresponding meaning. Thus, in various exemplary embodiments, a hot-spot is a defined portion of the presentation environment portion 64, 76, but is not accompanied by any visual indication of it's boundaries. In various exemplary embodiments, the boundaries of a hot-spot are defined to correspond to a visual image of the corresponding media device in the presentation environment portion 64, 76.

In various exemplary embodiments, the large central screen 57 serving as a presentation unit for slides, video segments, and other media presentations suitable for display on a video screen is selected by actuating the portion of the graphical user interface indicated by the hot-spot 59. In various exemplary embodiments, the hot-spot 59 is selected by mouse clicking within the portion of the graphical user interface defined as the hot-spot 59.

The hot-spot 59 is exemplary of any form of a hot-spot. Thus, in various exemplary embodiments, a hot-spot comparable to the hot-spot 59 is included for the lights 69, the loud speakers 68, and the printer 66. In a similar manner, in various exemplary embodiments, a hot-spot is defined for each media presentation element within any given media presentation environment. Likewise, in various exemplary embodiments, any known or later-developed method of actuating or selecting a widget is used to activate or select the media presentation device corresponding to a hot-spot.

FIGS. 1, 3 and 4 show, in slide object listing and selecting widget portion 14, that a user is currently working on a slide titled "Text 5". In various exemplary embodiments, a hyper-slide that a user is working on is displayed in a main display. In various exemplary embodiments, a selected display corresponds to the slide object preview portion 20. It should also be apparent in FIGS. 1, 3 and 4 that a user is working on the media presentation object titled Text 5 because an object having that title is emphasized within the slide animation order and timing widget portion 12.

In various exemplary embodiments, the dashed outline of hot-spot 59 corresponds to a media presentation device used to present a hyper-slide emphasized in slide object listing and selecting widget portion 14 and/or slide animation order and timing widget portion 12. In various exemplary embodiments of the systems and methods for authoring a media presentation according to this invention, only one hot-spot at a time within the media presentation environment representation portion 64 or 76 is outlined by a dashed line. Thus, in various exemplary embodiments, a graphical representation is provided within the media presentation interface 60, 70 to indicate a relationship corresponding a media presentation device to a hyper-slide.

Figure 5:
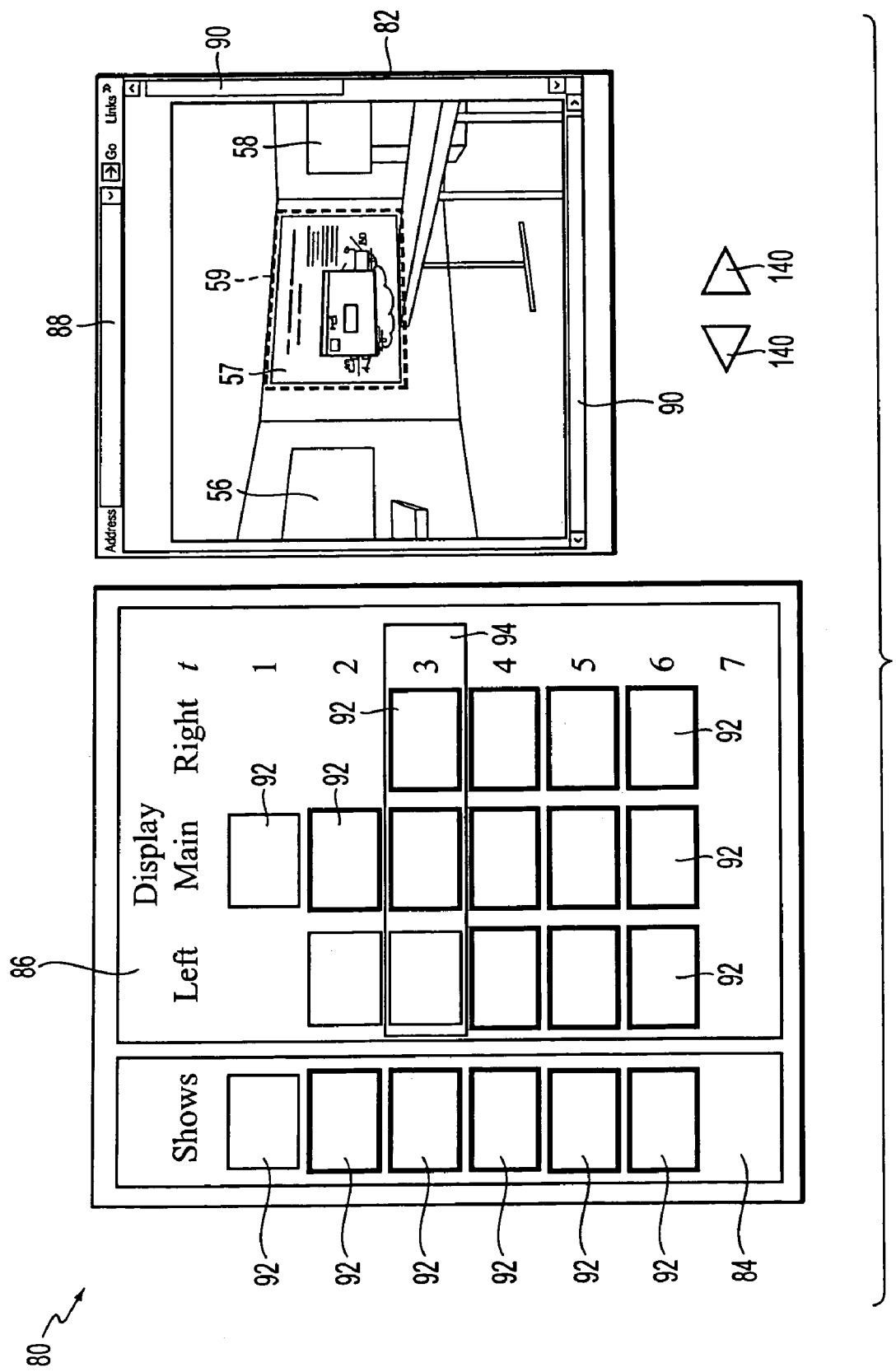
FIG. 5 is a schematic diagram of a fourth exemplary embodiment of a media presentation authoring interface according to this invention.

FIG. 5 is a schematic diagram of a fourth exemplary embodiment of a media presentation authoring interface according to this invention. Some of the elements in this figure are commonly numbered with elements previously discussed in connection with other figures. A duplicative discussion of those elements is omitted for the sake of simplicity. The media presentation interface 80 includes a media presentation environment representation portion 82, a hyper-slide listing widget portion 84, and a media presentation authoring widget portion 86.

The media presentation environment representation portion 82 includes a three-dimensional schematic representation of the media presentation environment. Unlike the media presentation environment representation portions 54 and 72, the three-dimensional media presentation environment representation portion 82 does not include a pictorial representation of the media presentation environment. In various exemplary embodiments, a user requests a view of a media presentation environment from any direction with a three-dimensional model, such as, for example, the exemplary embodiment depicted in FIG. 5.

In various exemplary embodiments of the systems and methods for authoring a media presentation according to this invention, a media presentation interface is provided having a media presentation environment representation that includes a three-dimensional schematic representation of the media presentation environment. In various exemplary embodiments of the systems and methods for authoring a media presentation according to this invention, a media presentation interface is provided including a media presentation environment representation that includes a combination of a three-dimensional schematic and a two-dimensional schematic of the media presentation environment.

In various exemplary embodiments of the systems and methods for authoring a media presentation according to this invention, a media presentation interface is provided including a media presentation environment representation having a combination of two-dimensional and three-dimensional schematic representations of the media presentation environment, and three-dimensional pictorial representations of the media presentation environment. It should be appreciated that, in various exemplary embodiments, any form of a representation of a media presentation environment currently known or later-developed is used. Likewise, it should be appreciated that, in various exemplary embodiments, any combination of presently known, or later-developed, representations of a media presentation environment is used.

In various exemplary embodiments, the media presentation environment representation portion 82 includes an address 88. In various exemplary embodiments, the address 88 identifies a location where the content corresponding to the media presentation environment representation portion 82 is located.

In various exemplary embodiments, the media presentation environment representation portion 82 includes orientation widgets 90. In various exemplary embodiments, the orientation widgets 90 are used to orient a perspective within the media presentation environment representation portion 82. Thus, in various exemplary embodiments, the orientation widgets 90 are scroll bars. It should be apparent that, in various exemplary embodiments, any currently known or later-developed widget capable of launching an event to alter an orientation of a media presentation environment represented in the media presentation environment representation portion 82 is used.

In the depicted orientation view of the media presentation environment shown in the media presentation environment representation portion 82 of FIG. 5, the display screens 56, 57 and 58 are visible. The media presentation authoring widget portion 86 includes three columns. The columns are labeled Display Left, Display Main, and Display Right. These three labels are descriptive labels corresponding to the displays indicated by video screens 56, 57 and 58. More specifically, the Display Left column in the media presentation authoring widget portion 86 corresponds to video screen 56. Likewise, the Display Main column in the media presentation authoring widget portion 86 corresponds to video screen 57. Similarly, the Display Right column in the media presentation authoring widget portion 86 corresponds to video screen 58.

In various exemplary embodiments, the media presentation authoring widget portion 86 also includes a column of sequential numbers. This column of sequential numbers corresponds to discrete times within a media presentation. Each increasing numerical unit corresponds to a time in a media presentation subsequent to a lower numerical unit in the column. The times with the media presentation correspond to states of the presentation.

In various exemplary embodiments, the media presentation authoring widget portion 86 includes hyper-slide widgets 92. Each individual hyper-slide widget 92 corresponds to a given hyper-slide in a media presentation. In various exemplary embodiments, a hyper-slide widget 92 visually depicts the content of the hyper-slide.

In various exemplary embodiments, the media presentation authoring widget portion 86 includes a selection indicating portion 94. As shown, the selection indicating portion 94 indicates a selection of time 3 in a media presentation. In various exemplary embodiments, a selected portion of a media presentation in a media presentation authoring widget portion 86 displays the selected hyper-slide widgets 92 in the media presentation environment representation portion 82 on media presentation devices corresponding to those indicated in the columns for the selected hyper-slides 92. Thus, in the depicted embodiment, the left-most hyper-slide at time 3 is shown on the left video screen 56 in the media presentation environment representation portion 82. Similarly, the center hyper-slide 92 at time 3 in the media presentation authoring widget portion 86 is depicted on the center video screen 57 in the media presentation environment representation portion 82. Likewise, the right-most hyper-slide 92 at time 3 in the media presentation authoring widget portion 86 is depicted on the right-most video screen 58 in media presentation environment representation portion 82.

In various exemplary embodiments, the number of columns in the media presentation authoring widget portion 86 corresponds to the number of media presentation devices controlled by the media presentation interface 80. In various exemplary embodiments, the media presentation authoring widget portion 86 displays all of the columns corresponding to the media presentation devices at the same time. In various exemplary embodiments, the media presentation authoring widget portion 86 displays a portion of the available columns.

In various exemplary embodiments, the media presentation authoring widget portion 86 includes orientation widgets for displaying one or more media presentation device columns for display in the media presentation authoring widget portion. In various exemplary embodiments, the media presentation authoring widget portion 86 includes orientation widgets that are scroll bars such as orientation widgets 90. It should be apparent that, in various exemplary embodiments, the media presentation authoring widget portion 86 includes orientation widgets according to any currently known or later-developed form of graphical user interface for changing an orientation view within the graphical user interface.

It should also be apparent that the hyper-slide widgets 92 are, in various exemplary embodiments, checkboxes such as those depicted in animation slide object listing and selecting widget portion 14, and an associated hyper-slide object preview portion such as the slide preview portion 20. Similarly, it should be apparent that any currently known or later-developed widget for selecting and depicting the content of a hyper-slide are incorporated in the media presentation authoring widget portion 86 in various exemplary embodiments of the systems and methods for authoring a media presentation according to this invention.

In various exemplary embodiments, the hyper-slide listing widget portion 84 includes hyper-slide widgets 92. In various exemplary embodiments, a hyper-slide widget 92 is included in the hyper-slide listing widget portion 84 for every hyper-slide included in a media presentation. In various exemplary embodiments, the hyper-slide listing widget portion 84 further includes an orientation widget for selecting a display of one or more hyper-slides 92 from among a greater number of hyper-slides 92 than the one or more hyper-slides 92 displayed at a given time in the hyper-slide listing widget portion 84. In various exemplary embodiments, the hyper-slide listing widget portion 84 includes orientation widgets that are scroll bars such as those shown for orientation widgets 90.

In various exemplary embodiments, the number of columns displayed in the media presentation authoring widget portion 86 is variable. In various exemplary embodiments, a user determines the number of columns displayed in the media presentation authoring widget portion 86 by selecting the columns that are displayed. In various exemplary embodiments, a user selects a column to be displayed in the media presentation authoring widget portion 86 by actuating a widget corresponding to that media presentation device in the media presentation environment representation portion 82. Thus, in various exemplary embodiments, by clicking on a hot-spot corresponding to, for example, video display screen 57, a column corresponding to the main display is added to the media presentation authoring widget portion 86. Further, in various exemplary embodiments, the number of columns displayed in the media presentation authoring widget portion 86 increases, and decreases, dynamically in response to events launched by a user.

In various exemplary embodiments, a user organizes a media presentation by dragging hyper-slides 92 from the hyper-slide listing widget portion 84 to a column and row in the media presentation authoring widget portion 86 corresponding to a media device and time in a media presentation where the content of that hyper-slide is desired. In various exemplary embodiments of the systems and methods for authoring a media presentation according to this invention, the media presentation is further arrangeable by copying or moving hyper-slides 92 from one location within the media presentation authoring widget portion 86 to another location in the media presentation authoring widget portion 86. In various exemplary embodiments, the movement of a hyper-slide 92 is accomplished by dragging and dropping the hyper-slide 92.

In various exemplary embodiments, a hyper-slide 92 is moved or copied by activating a copy, and/or a cut-and-paste, functionality of the media presentation interface 80. It should be apparent that any currently known or later-developed system or method for moving or copying a widget is used in various exemplary embodiments to move or copy a hyper-slide 92 from one location in the hyper-slide listing widget portion 84 or the media presentation authoring widget portion 86 to another location.

In various exemplary embodiments, entire rows in the media presentation authoring widget portion 86 are movable by executing a functionality to select the row and then executing a functionality to either cut or paste the contents of that row to another location in the media presentation authoring widget portion 86. Thus, in various exemplary embodiments, the timing of a media presentation is able to be rearranged in the media presentation authoring widget portion 86. Similarly, in various exemplary embodiments, any imaginable geometric combination or shape of hyper-slides 92 within the media presentation authoring widget portion 86 is able to be selected, and then copied, or cut-and-pasted, from one location to another location in the media presentation authoring widget portion 86. It should be apparent that, in various exemplary embodiments, any known or later-developed system or method for selecting one or more widgets, and for copying, or cutting-and-pasting, widgets from one location to another within a graphical user interface are used in the present invention.

In connection with any of the severally described foregoing exemplary embodiments, or like exemplary embodiments, a user compiles a play list. A play list is an association of state indexes t, hot-spots h, and hyper-slides s, defining that at a particular state t, a device h plays a hyper-slide s. Thus, in various exemplary embodiments, a play list for a multiple channel media presentation is a sorted list of associations with a key of state index. In various exemplary embodiments of the systems and methods according to this invention, a plurality of hyper-slides are connected and associated with respective output devices to form a play list that, in various exemplary embodiments, is played by a play back function.

In this manner, in various exemplary embodiments, a user progressively orients a selection portion 94 within the media presentation authoring widget portion 86 to preview the media presentation on the media devices visible in the media presentation environment representation portion 82.

In various exemplary embodiments, the systems and methods for authoring a media presentation according to this invention include a functionality for associating any given type of hyper-slide 92 with a specified media presentation device. Thus, for example, in various exemplary embodiments, when a hyper-slide 92 is created containing a textual slide, or a video clip, then a primary media presentation device, for example, a video screen, is defined to be associated with that hyper-slide 92. In this manner, in various exemplary embodiments, hyper-slides 92 that are textual slides or video clips are associated with main display screen 57 upon their creation.

In various exemplary embodiments, a user redefines an association of a hyper-slide 92 with a different media device. For example, in various exemplary embodiments, to redefine an association of a hyper-slide 92 with a different media device, a user redefines an association of a hyper-slide with a media device by actuating a hot-spot associated with the desired media device. Thus, for example, in various exemplary embodiments, a user selects one or more desired hyper-slides 92 in the hyper-slide listing widget portion 84 and/or the media presentation authoring widget portion 86 and then mouse clicks on a hot-spot indicated, for example, by the dashed line 59 surrounding the main display screen 57 in the media presentation environment representation 82.

In various exemplary embodiments, every controllable device in the presentation environment is mapped to a hotspot in the presentation environment representation 64, 72, 82.

Figure 6:
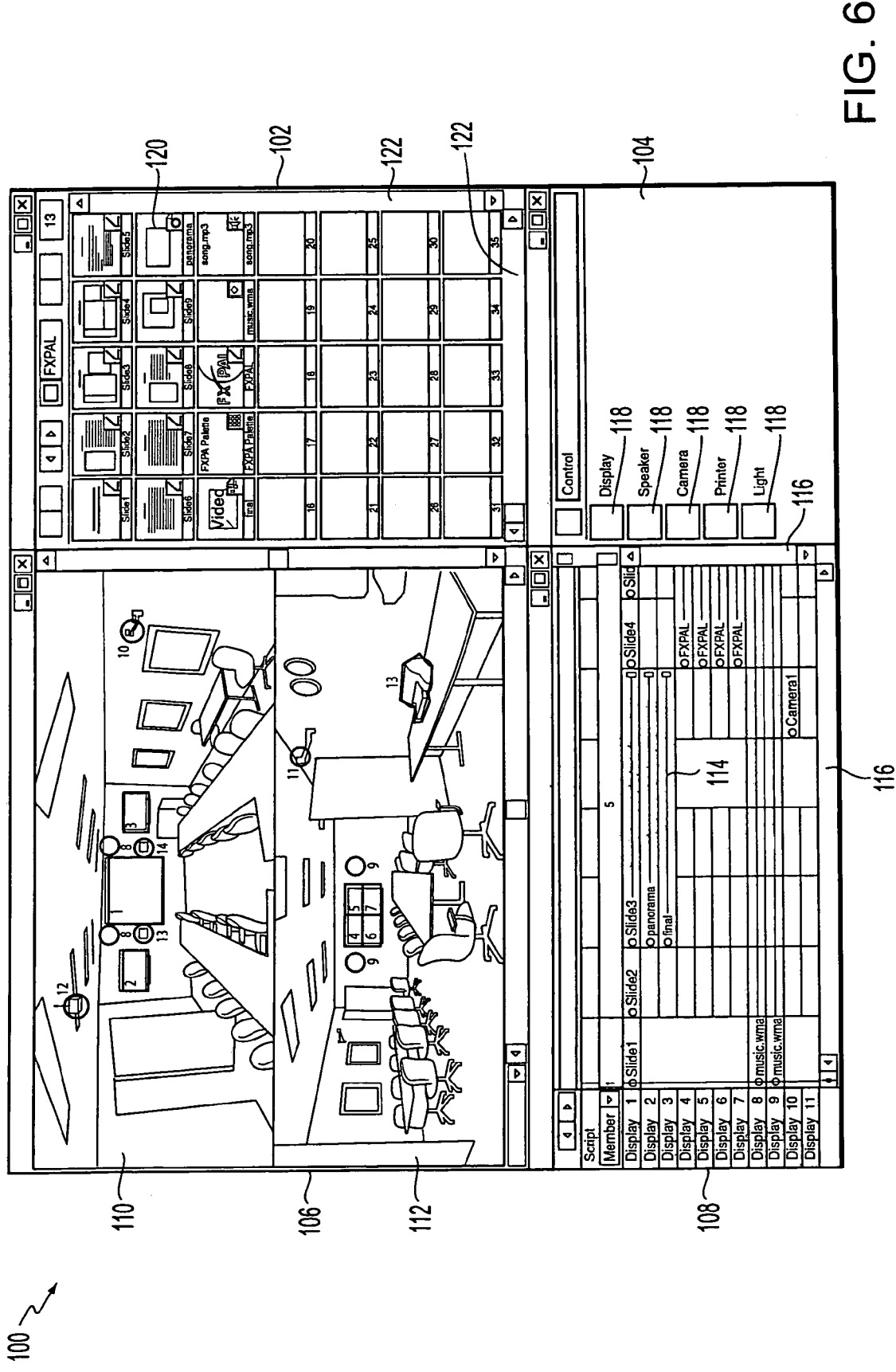
FIG. 6 is a schematic diagram of a fifth exemplary embodiment of a media presentation authoring interface according to this invention.

FIG. 6 is a schematic diagram of a fifth exemplary embodiment of a media presentation authoring interface according to this invention. FIG. 6 shows a media presentation interface 100 including a hyper-slide listing widget portion 102, a media device listing widget portion 104, a media presentation environment representation portion 106, and a media presentation device-time table widget portion 108 (authoring portion). In various exemplary embodiments, the media presentation environment representation portion 106 includes a front view representation of the media presentation environment 110 and a rear view representation of the media presentation environment 112. In various exemplary embodiments, the front view representation of the media presentation environment 110 and the rear view representation of the media presentation environment 112 include numbers associated with media presentation devices.

In various exemplary embodiments, the media presentation device-time table widget portion 108 includes lines for each media presentation device according to the numbers associated therewith in the media presentation environment representation portion 106. In various exemplary embodiments, the media presentation device-time table widget portion 108 includes columns corresponding to discrete times in, and thus states of, a media presentation. In various exemplary embodiments, the media presentation device-time table widget portion 108 includes widgets 114. In various exemplary embodiments, the presence of a widget 114 at an intersection of a row corresponding to a media presentation device and a column corresponding to a specific time during the media presentation indicates the activation of that media presentation device at that time in the media presentation.

In various exemplary embodiments, the widgets 114 are bars. In various exemplary embodiments, the length of a bar representing a widget 114 is changeable by dragging and dropping an end portion of the bar. Likewise, in various exemplary embodiments, aspects of a media presentation are alterable by dragging and dropping, copying, and/or cutting-and-pasting a widget 114 within the media presentation device-time table widget portion 108.

In various exemplary embodiments, the media presentation device-time table widget portion 108 contains a representation wherein all media devices used in the media presentation and all times of the media presentation are visible at once.

In various exemplary embodiments, orientation widgets 116 are included in the media presentation device-time table widget portion 108. In various exemplary embodiments, the orientation widgets 116 are scroll bars. In various exemplary embodiments, the orientation widgets 116 are used to view portions of a media presentation outside a field of view in the media presentation device-time table widget portion 108. It should be apparent that, in various exemplary embodiments of the systems and methods for authoring a media presentation according to this invention, the orientation widgets 116 take any currently known or later-developed form.

In various exemplary embodiments, the media presentation environment representation portion 106 is a three-dimensional representation of the media presentation environment. In various exemplary embodiments, the media presentation environment representation portion 106 is a two-dimensional representation of the media presentation environment. In various exemplary embodiments, the media presentation environment representation portion 106 is a photographic representation of the media presentation environment. In various exemplary embodiments, the media presentation environment representation portion 106 is a diagrammatic representation of the media presentation environment. In various exemplary embodiments, the media presentation environment representation portion 106 contains more than one view of a portion of the media presentation environment. In various exemplary embodiments, any combination of the foregoing is included in the media presentation environment representation portion 106.

In various exemplary embodiments, the media presentation device listing widget portion 104 includes one or more media presentation device widgets 118. In various exemplary embodiments, each media presentation device widget 118 corresponds to a particular media presentation device. In various exemplary embodiments, the media presentation device is a display, a loud speaker, a camera, a printer, a light, or any other known or later-developed media presentation device.

The hyper-slide listing widget portion 102 includes hyper-slide widgets 120. In various exemplary embodiments, each hyper-slide has its own hyper-slide widget 120. In various exemplary embodiments, the hyper-slide listing widget portion 102 displays a hyper-slide widget 120 for every available hyper-slide. In various exemplary embodiments, the hyper-slide listing widget portion 102 displays hyper-slide widgets 120 representing only a portion of the available hyper-slides for the media presentation. Thus, in various exemplary embodiments, the hyper-slide listing widget portion 102 includes orientation widgets 122. In various exemplary embodiments, the orientation widgets 122 are scroll bars. It should be apparent that, in various exemplary embodiments, the orientation widgets 122 are any currently known or later-developed widget capable of altering an orientation in a graphical user interface.

In various exemplary embodiments, hot-spots are defined in the media presentation environment representation portion 106 for each media device. In various exemplary embodiments, a user defines the hot-spots in the media presentation environment representation portion 106 by marking the boundaries of the hot-spot with a mouse. In various exemplary embodiments, a user defines the type of media device associated with a hot-spot in the media presentation environment representation portion 106 by dragging a media device widget 118, corresponding to the desired type of media device, from the media device listing widget portion 104 to a defined hot-spot in the media presentation environment representation portion 106. In various exemplary embodiments, a user drags a hyper-slide from the hyper-slide listing widget portion 102 to a hot-spot defined in the media presentation environment representation portion 106. In various exemplary embodiments, when a user drags a hyper-slide from the hyper-slide listing widget portion 102 to a hot-spot in the media presentation environment representation portion 106, a widget 114 is added on the line corresponding to the associated media display device for the hyper-slide corresponding to that hyper-slide widget 120. In various exemplary embodiments, a user then adjusts the beginning and end show time for the selected hyper-slide by adjusting the widget 114 in the media presentation device-time table widget portion 108.

In the foregoing manner, for example, in various exemplary embodiments, a multi-channel media presentation is authored by filling out and completing a device-time table. Thus, in various exemplary embodiments, an individual hyper-slide representation is generated for every hyper-slide, such as, for example, a PowerPoint slide. In various exemplary embodiments, generated hyper-slide representations are used for drag-and-drop operations while authoring a presentation. In various exemplary embodiment of this invention, drag-and-drop operations while authoring a presentation are accomplished by generating a sequence of ".jpg" thumbnail images for various hyper-slides, such as, for example, PowerPoint slides. Thus, in various exemplary embodiments of the system and methods of this invention, a hyper-slide is mapped to a .jpg image, and vice versa.

In various exemplary embodiments of this invention, hyper-slides are natural file-system files. In various exemplary embodiments, some input sources, such as, for example, live video cameras and microphones are not natural file-system files. Thus, in various exemplary embodiments of this invention, iconic files representing certain hyper-slides are introduced. In various exemplary embodiments, the introduction of iconic files representing certain hyper-slides is done in order to maintain consistent semantics of the drag-and-drop mechanism. Thus, in various exemplary embodiments, users treat a camera as a regular file, and show a live video feeding from the camera to a display, by dragging an iconic file representing a camera to a display hotspot in the presentation environment representation portion 54, 64, 72, 82, or 106.

Figure 7:
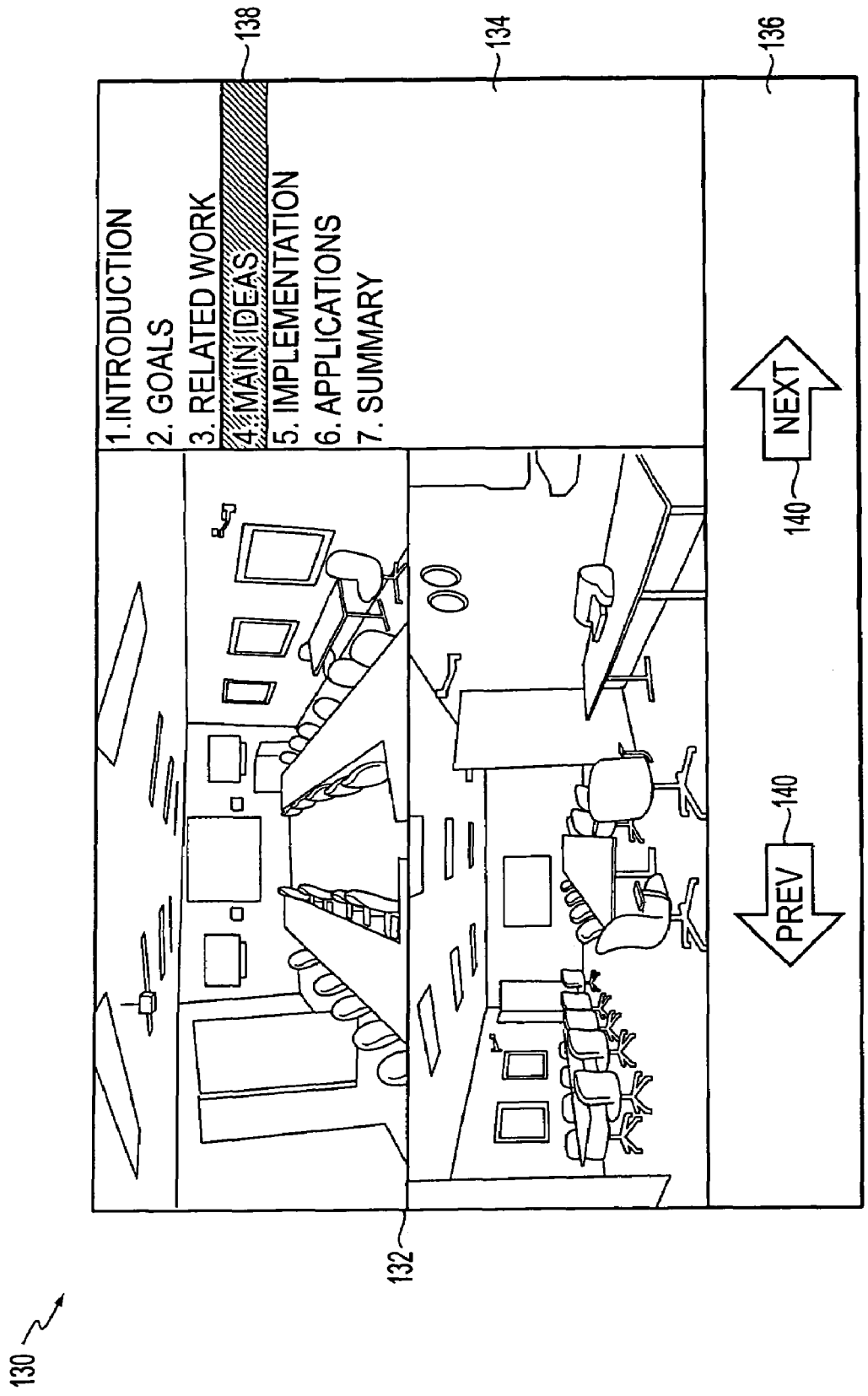
FIG. 7 is a schematic diagram of an exemplary embodiment of a media presentation simulation interface according to this invention.

FIG. 7 is a schematic diagram of an exemplary embodiment of a media presentation simulation interface according to this invention. Media presentation simulation interface 130 is a media presentation simulation interface designed to facilitate the testing of a media presentation fully authored in a real media presentation environment. It should be apparent that in many instances it is beneficial to test a media presentation after authoring it to ensure that the presentation operates as desired.

Media presentation interface 130 includes a media presentation environment representation portion 132, a media presentation outline portion 134 and a media presentation movement widget portion 136. In various exemplary embodiments, the media presentation outline portion 134 includes a list identifying sections of a media presentation. In various exemplary embodiments, the media presentation outline portion 134 includes an emphasis portion 138 that emphasizes a portion of a list identifying sections of a media presentation.

In various exemplary embodiments, the media presentation movement widget portion 136 includes one or more movement widgets 140. In various exemplary embodiments, the movement widgets 140 are arrows. In various exemplary embodiments, the movement widgets control movement to next and previous time portions of a media presentation. In various exemplary embodiments, the next and previous time portions of a media presentation correspond to columns or rows in a media presentation authoring widget portion such as the media presentation authoring widget portions 86 or 108. It should be apparent that, in various exemplary embodiments, any currently known or later-developed movement widget is used for the movement widgets 140.

In various exemplary embodiments, the media presentation environment representation portion 132 generates a simulation video simulating the media presentation. In various exemplary embodiments, the media presentation environment representation portion 132 generates a simulation video of the media presentation by synthetically adding the image of the authored media presentation to the portion corresponding to the associated media presentation devices.

In various exemplary embodiments, preview functionality provides presenters with helpful feedback for revising a media presentation. In various exemplary embodiments, preview functionality works offline. That is, in various exemplary embodiments, preview functionality is not connected to the real media presentation environment venue. In various exemplary embodiments, preview functionality works online. That is, In various exemplary embodiments, preview functionality is connected to the real media presentation environment venue. In various exemplary embodiments of this invention, several preview options are provided, including, but not limited to, the following preview options: a rendered image sequence mode, a VRML mode, and a live video mode.

In various exemplary embodiments of this invention, during operation of a presentation preview function, the rendered image sequence mode renders pictures of hyper-slides, if applicable, in regions of hotspots of related media presentation devices in a presentation environment representation portion. In various exemplary embodiments of this invention, rendering a picture of a hyper-slide in a hotspot indicates a corresponding portion of the media presentation, such as, for example, that the rendered image would be shown with the associated media presentation device during the actual media presentation is the real media presentation environment venue.

In various exemplary embodiments of this invention, during operation of a presentation preview function, the VRML mode provides a three dimensional model preview of the media presentation to a user. In various exemplary embodiments, the VRML mode of presentation preview replaces a pictorial image of the presentation environment with a three dimensional model. In various exemplary embodiments, the VRML mode of presentation preview enables the user to change the viewpoint to observe the presentation effect. In various exemplary embodiments, the user changes the viewpoint to observe a presentation effect with a pop-up menu. In various exemplary embodiments, the user also performs zoom-in and zoom-out functions in a presentation preview. In various exemplary embodiments, the user checks details or an overview of the authored media presentation with the various functions and features of the various embodiments of the VRML mode of presentation previewing.

In various exemplary embodiments of this invention, during operation of a presentation preview function according to the live video mode, the presentation environment representation portion plays a live video captured by a camera mounted in the real media presentation environment forum. Thus, in various exemplary embodiments, a media presentation presenter sees a desired portion of the media presentation as one or more actual effects in real time. In various exemplary embodiments, the systems and methods of this invention are used as a teleconference tool in the live video mode. Thus, in various exemplary embodiments, in the live video mode of presentation preview, a presentation presenter give a live media presentation to remote audience including the viewing a live video of an actual media presentation environment forum that is remote to the audience.

In various exemplary embodiments, preview functionality is included with any embodiment of a media presentation authoring interface, including, but not limited to, those exemplary embodiments of a media presentation authoring interface described herein.

In various exemplary embodiments of the systems and methods for authoring a media presentation according to this invention, a media presentation system is connected to a media presentation environment directly, and a user is enabled to watch the media presentation directly on the media devices in the media presentation environment.

In various exemplary embodiments of the systems and methods for authoring a media presentation according to this invention, a media presentation-component time relation portion is used as a media presentation authoring portion. In various exemplary embodiments of the systems and methods for authoring a media presentation according to this invention, a media presentation environment representation portion, such as the exemplary media presentation environment representation portions described herein, is used as a media presentation authoring portion. Thus, for example, in various exemplary embodiments, a hyper-slide is dragged to an image of an associated media presentation device in a media presentation environment representation portion. In various exemplary embodiments of the systems and methods for authoring a media presentation according to this invention, both a media presentation-component time relation portion and a media environment representation portion are used as media presentation authoring portions.

This invention enables presenters to easily coordinate hyper-slides or smaller presentation units on different displays for an improved and engaging media presentation. The systems and methods for authoring a media presentation according to this invention enable the control of lighting effects, sound effects, including surround sound, printing effects, wind blowers, sprinklers, and other specially designed articulators, stereoscopic projectors, live camera connections to a remote site, and any other currently known or later-developed media presentation device or effect.

Figure 8:
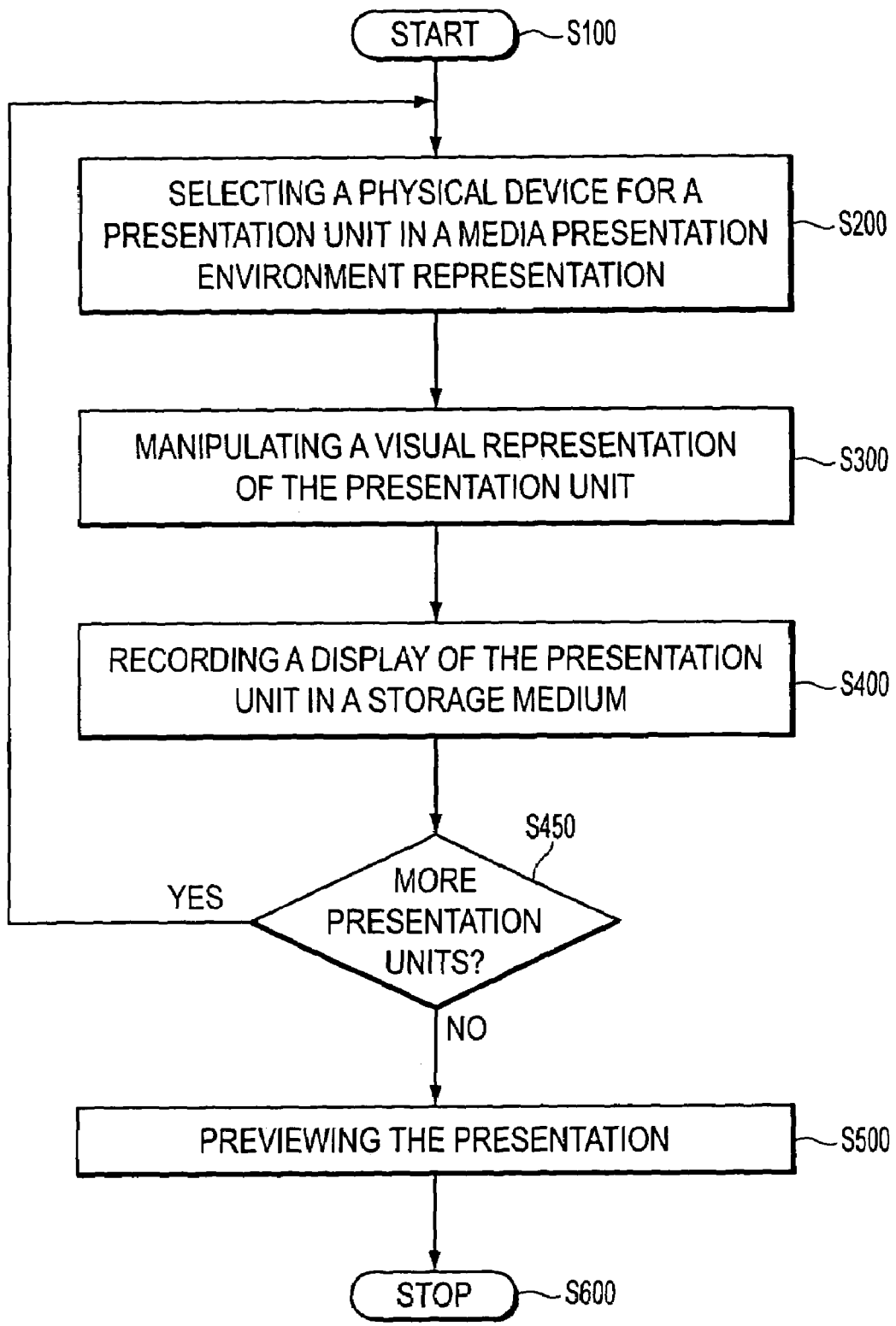
FIG. 8 is a flow chart of an exemplary embodiment of a media presentation authoring method according to this invention.

FIG. 8 is an exemplary embodiment of a media presentation authoring method according to this invention. Beginning in step S100, control proceeds to step S200, where a physical device for a presentation unit in a media presentation environment representation is selected. Next, in step S300, a visual representation of the presentation unit is manipulated. Then, in step S400, a display of the presentation unit is recorded in a storage medium. Operation then continues to step S450.

In step S450, an evaluation is performed whether additional presentation units exist. If the outcome of the evaluation is a determination that additional presentation units exist, then operation returns to step S200 and the process is repeated for the additional presentation unit. If the outcome of the evaluation in step S450 is that additional presentation units do not exist, then operation continues to step S500.

In step S500, the presentation is previewed. In various exemplary embodiments, the presentation is previewed in an augmented reality environment. An augmented reality environment is an environment where the real world and the virtual world are combined in an image. Thus, for example, representations of the presentation environment that are pictorial in nature, when combined with hot spots, dashed line outlines, circles, numbers, and other images superimposed thereon, form an augmented reality. In various exemplary embodiments, the presentation is previewed in a virtual reality environment. In various exemplary embodiments, the virtual reality environment is graphics based. In various exemplary embodiments, the previewed presentation is a simulated presentation viewed in a simulated presentation environment.

In various exemplary embodiments, the presentation is previewed in a simulated presentation environment including a combination of a virtual reality environment and an augmented reality environment.

Control then proceeds to step S600, where operation of the method stops.

Figure 9:
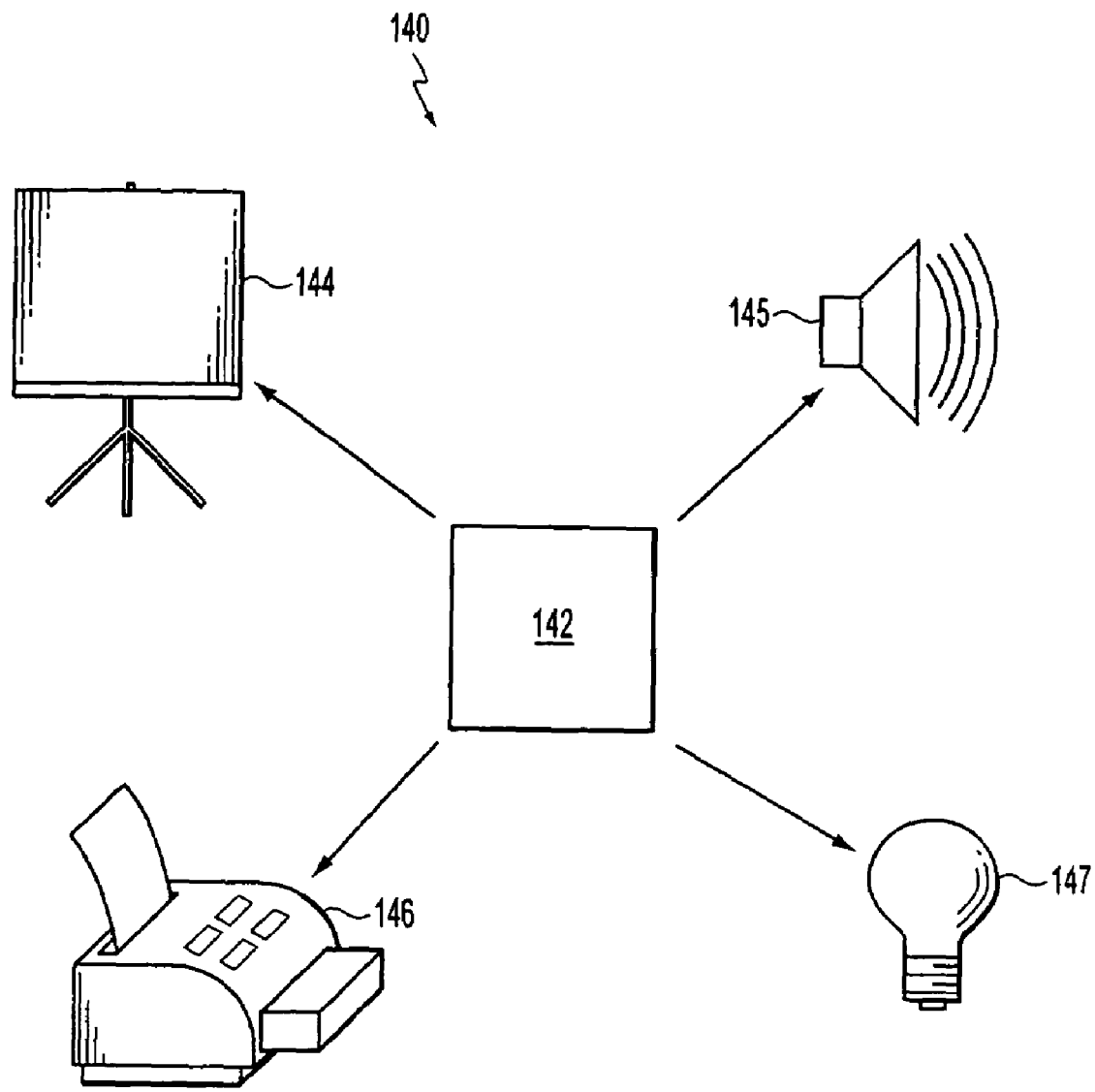
FIG. 9 is a schematic diagram of an exemplary embodiment of a media presentation playback model that plays back an authored media presentation according to this invention.

FIG. 9 is a schematic diagram of an exemplary embodiment of a media presentation playback model that plays back an authored media presentation according to this invention.

The media presentation playback model 140 includes a master computer 142 and remote control agents 144, 145, 146 and 147. The remote control agents 144, 145, 146 and 147 correspond to any media presentation device including, but not limited to, those media presentation devices mentioned herein. Thus, in various exemplary embodiments, as depicted in FIG. 9, remote control agent 144 corresponds to a display, remote control agent 145 corresponds to a loud speaker, remote control agent 146 corresponds to a printer, and remote control agent 147 corresponds to some form of lighting.

In various exemplary embodiments of the systems and methods according to this invention, a computer program pertaining to this invention runs on the master computer 142. In various exemplary embodiments, the master computer 142 is operated by a presenter responsible for presenting an authored media presentation. In various exemplary embodiments, the master computer 142 is located in any location where the presenter of an authored media presentation is located.

In various exemplary embodiments, a plurality of computers run software corresponding to this invention. In various exemplary embodiments, one or more of the remote control agents 144, 145, 146 and 147 is connected to a computer running a program corresponding to this invention. In various exemplary embodiments, all of a plurality of remote control agents are connected to one or more computers running a program corresponding to this invention. In various exemplary embodiments, one or more of the remote control agents 144, 145, 146 and 147 are connected to the master computer 142 that is running a computer program pertaining to this invention.

In various exemplary embodiments of the systems and methods of this invention, an authored media presentation presenter presses a page-down key and all state, hotspot, hyper-slide associations with the same state index are checked. In contradistinction, a single-channel presentation tool often only advances a slide on one display when a page-down key is pressed. In various exemplary embodiments of the systems and methods according to this invention, when an authored media presentation presenter presses a page-down key, a corresponding play command is sent to all involved remote control agents 144, 145, 146 and 147. In various exemplary embodiments, the remote control agents 144, 145, 146 and 147 control attached media presentation devices, in turn.

Thus, in various exemplary embodiments of the systems and methods according to this invention, an authored media presentation is played back by a presentation presenter who controls a plurality of media presentation devices with a single keystroke or a single mouse click, or other simple actuating action or step.

Figure 10:
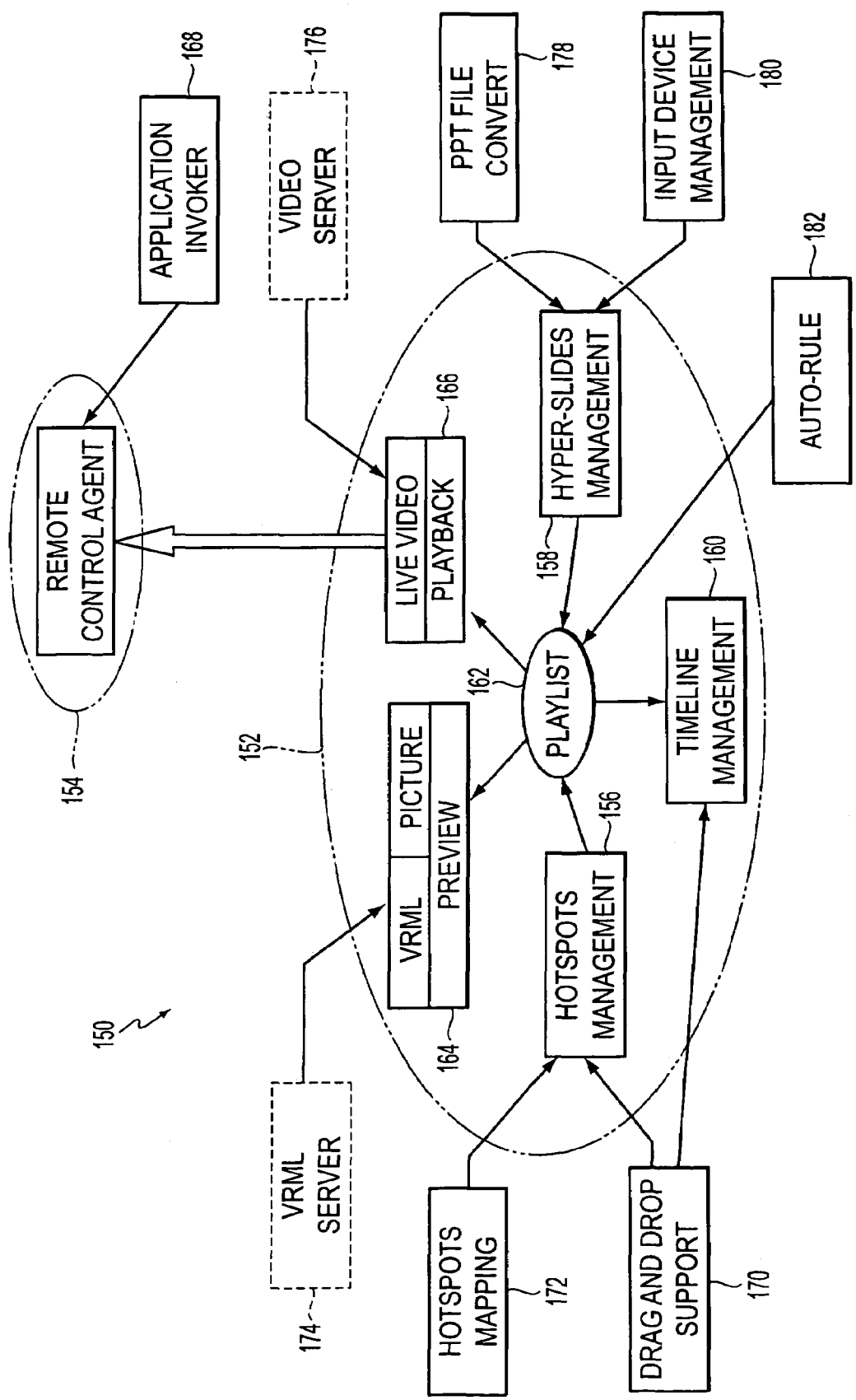
FIG. 10 is a schematic diagram of an exemplary embodiment of a media presentation authoring system architecture according to this invention.

FIG. 10 is a schematic diagram of an exemplary embodiment of a media presentation authoring system architecture according to this invention.

Media presentation authoring system architecture 150 includes media presentation authoring, presentation and preview software component 152 and one or more remote control agents 154. The media presentation authoring, presentation and preview software component 152 includes a hotspots management component 156, a hyper-slide management component 158, a timeline management component 160, a play list component 162, a presentation preview component 164, and a presentation playback component 166. In various exemplary embodiments, the presentation preview component 164 and the presentation playback component 166 read content of the play list component 162, extract associations, such as, for example, the associations described herein, from the content of the play list component 162, and send action commands corresponding to authored media presentation actions to the one or more remote control agents 154.

In various exemplary embodiments, a remote control agent 154 runs on every computer to which one or more media presentation device used in the authored media presentation is connected. In various exemplary embodiments, the one or more remote control agents 154 monitor the authored media presentation on a predefined port of each computer on which a remote control agent 154 is running. In various exemplary embodiments, the one or more remote control agents 154 receive action commands sent by the media presentation authoring, playback and preview software component 152. In various exemplary embodiments, upon receiving action commands, the one or more remote control agents 154 launch an external application to generate one or more outputs for a corresponding media presentation device. In various exemplary embodiments, the one or more remote control agents 154 launch an external application in connection with an application invoker 168.

In various exemplary embodiments, taking a PowerPoint slide as an example of any hyper-slide, the one or more remote control agents 154 use automation technology such as Microsoft automation technology to automate a software package, such as, for example, Microsoft PowerPoint XP. In various exemplary embodiments, the one or more remote control agents 154 use automation technology in order to show a full screen hyper-slide on a display.

In various exemplary embodiments, the media presentation authoring, playback and preview software component 152 either interfaces with, or includes, a drag and drop support component 170, a hotspot mapping component 172, a VRML server component 174, a video server component 176, a PowerPoint file conversion component 178, an input device management component 180 and an auto-rule component 182. The drag and drop support component 170, the hotspot mapping component 172, the VRML server component 174, the video server component 176, the PowerPoint file conversion component 178, the input device management component 180 and the auto-rule component 182 are utilized to implement various aspects of this invention described herein.

This invention has been described in conjunction with the exemplary embodiments outlined above. Various alternatives, modifications, variations, and/or improvements, are within the spirit and scope of the invention whether known or presently unforeseen. Accordingly, the exemplary embodiments of the invention, as set forth above, are intended to be illustrative, not limiting. Various changes may be made without departing from the spirit and scope of the invention. Therefore, the invention is intended to embrace all known or later developed alternatives, modifications, variations and/or improvements.

What is claimed is:

1. A computer readable storage medium embodying a set of computer-executable instructions, which, when executed by one or more processors cause the one or more processors to generate a media presentation authoring interface, comprising:

a media presentation environment representation that depicts a real-life media presentation environment where a media presentation is to be presented, wherein the real-life media presentation environment is depicted in a virtual reality or an augmented reality, wherein the media presentation environment representation includes multiple hot-spots, each of the hot-spots being associated with a corresponding media presentation device in the real-life media presentation environment, wherein the media presentation environment representation indicates a positional arrangement of a plurality of media presentation devices in the real-life media presentation environment, wherein the media presentation devices are selectable via the corresponding hot-spots, and wherein the media presentation environment representation provides a preview of a media presentation based on a user-selection of one of the media presentation devices.

2. The computer readable storage medium of claim 1, wherein the media presentation environment representation is a pictorial representation of the real-life media presentation environment.

3. The computer readable storage medium of claim 1, wherein the media presentation environment representation includes multiple views of the real-life media presentation environment.

4. A computer readable storage medium embodying a set of computer-executable instructions, which, when executed by one or more processors cause the one or more processors to generate a media presentation authoring interface, comprising:

a hyper-slide listing widget;
an animation order widget;
a hyper-slide preview portion; and
a media presentation environment representation that depicts a real-life media presentation environment where a media presentation is to be presented, wherein the real-life media presentation environment is depicted in a virtual reality or an augmented reality, wherein the media presentation environment representation includes multiple hot-spots, each of the hot-spots corresponding to a specific media presentation device in the real-life media presentation environment, wherein the media presentation environment representation indicates a positional arrangement of a plurality of media presentation devices in the real-life media presentation environment, wherein the media presentation devices are selectable via the corresponding hot-spots, and wherein the media presentation environment representation provides a preview of a media presentation based, on a user-selection of one of the media presentation devices.

5. The computer readable storage medium of claim 4, wherein the media presentation authoring interface further comprises a level of granularity selecting widget.

6. The computer readable storage medium of claim 4, wherein the media presentation environment representation is a pictorial representation of the real-life media presentation environment.

7. The computer readable storage medium of claim 4, wherein the media presentation environment representation includes multiple views of the real-life media presentation environment.

8. A computer readable storage medium embodying a set of computer-executable instructions, which, when executed by one or more processors cause the one or more processors to generate a media presentation authoring interface, comprising:

a media presentation environment representation that depicts a real-life media presentation environment where a media presentation is to be presented, wherein the real-life media presentation environment is depicted in a virtual reality or an augmented reality;

a hyper-slide listing widget; and a media presentation authoring widget, wherein the media presentation environment representation includes multiple hot-spots, each of the hot-spots being associated with a corresponding media presentation device in the real-life media presentation environment, wherein the media presentation environment representation indicates a positional arrangement of a plurality of the media presentation devices in the real-life media presentation environment, wherein the hyper-slide listing widget includes one or more hyper-slides for use in a media presentation, wherein the media presentation authoring widget includes portions associated with the corresponding media presentation devices and a portion associated with a particular time during the media presentation, wherein the media presentation devices are selectable via the corresponding hot-spots, and wherein the media presentation environment representation provides a preview of the media presentation based on a user-selection of one of the media presentation devices.

9. The computer readable storage medium of claim 8, wherein the media presentation environment representation is a pictorial representation of the real-life media presentation environment.

10. The computer readable storage medium of claim 8, wherein the media presentation authoring widget includes one or more bar widgets that extend for more than one time portion of the media presentation.

11. The computer readable storage medium of claim 10, wherein the one or more bar widgets have an adjustable length.

12. The computer readable storage medium of claim 8, further comprising a media presentation device listing widget.

13. The computer readable storage medium of claim 12, wherein a user defines a correspondence between one of the hot-spots in the media presentation environment representation and a media presentation device listed in the media presentation device listing widget.

14. A method for authoring a media presentation comprising:

within a media presentation environment representation that depicts a real-life media presentation environment where a media presentation is to be presented, wherein the real-life media presentation environment is depicted in a virtual reality or an augmented reality, selecting a physical device for a media presentation unit via a hot-spot in the media presentation environment representation, wherein the selected hot-spot corresponds to the physical device;

manipulating a visual representation of the media presentation unit;

recording a display of the media presentation unit in a storage medium; and previewing the media presentation, wherein the media presentation environment representation indicates a positional arrangement of a plurality of physical devices in the real-life media presentation environment and wherein previewing the media presentation is based on the selected physical device.

15. The method for authoring a media presentation according to claim 14, wherein the manipulating includes interacting with the visual representation of the presentation unit in the media presentation environment representation via a computer.

16. A method for authoring a media presentation according to claim 14, wherein the physical device is part of the real-life media presentation environment.

17. The method for authoring a media presentation according to claim 14, wherein the manipulating includes dragging the visual representation of the media presentation unit from an integrated presentation authoring environment or from a file directory and dropping the visual representation of the presentation unit on the hot-spot corresponding to the physical device.

18. The method for authoring a media presentation according to claim 14, wherein the physical device is selected from a list of multiple physical devices in the real-life media presentation environment, wherein the list comprises a display, a projector, a printer, a loud speaker, a light, a facsimile machine, a computer, a tape recorder, a video recorder, a camera, a fan, an air blower, a sprinkler, a water faucet, and a stereoscopic projector.

19. The method for authoring a media presentation according to claim 14, wherein the media presentation unit is selected from a list, wherein the list comprises a digital file, a sound, an audio segment, a video segment, a streaming video signal, a streaming audio signal, a turn light on action, a-turn light off action, a dim light action, a brighten light action, a text box, an image, a-turn display on action, turn display off action, a turn projector on action, a-turn projector off action, print action, a brighten display action, a dim display action, a send facsimile action, and a computer action.

20. The method for authoring a media presentation according to claim 14, wherein the previewing includes previewing the media presentation in an augmented reality environment.

21. The method for authoring a media presentation according to claim 14, wherein the previewing includes previewing the media presentation in a virtual reality environment.

22. The method for authoring a media presentation according to claim 14, wherein the previewing includes previewing the media presentation in a combination of an augmented reality environment and a virtual reality environment.

23. The method for authoring a media presentation according to claim 14, wherein the previewing further comprises previewing the media presentation in a graphics based virtual reality environment.

24. The method for authoring a media presentation according to claim 14, further comprising repeating the selecting, the manipulating and the recording for a plurality of media presentation units.

25. A computer readable storage medium embodying a set of computer-executable instructions, which, when executed by one or more processors cause the one or more processors to generate a media presentation authoring interface, comprising:
    a media presentation environment representation that depicts a real-life media presentation environment where a media presentation is to be presented, wherein the real-life media presentation environment is depicted in a virtual reality or an augmented reality, wherein the media presentation environment representation includes multiple hot-spots, each of the hot-spots being associated with a corresponding media presentation device in the real-life media presentation environment, wherein the media presentation environment representation indicates a positional arrangement of a plurality of media presentation devices in the real-life media presentation environment, wherein the media presentation devices are selectable via the corresponding hot-spots, and wherein the media presentation environment representation provides a preview of a media presentation based on a user-selection of one of the media presentation devices; and
    a media presentation movement widget in a media presentation previewing interface,
wherein a media presentation is previewed in a virtual environment depicted in the media presentation environment representation portion, and
wherein the media presentation movement widget controls a flow of the media presentation preview.

26. The computer readable storage medium of claim 25; wherein the media presentation preview interface further comprises a media presentation outline portion.

27. The computer-readable storage medium according to claim 25, wherein the media presentation authoring interface controls multiple types of media presentation devices.

28. A computer readable storage medium embodying a set of computer-executable instructions, which, when executed by one or more processors cause the one or more processors to generate a media presentation authoring interface, comprising:
    a media presentation environment representation that depicts a real-life media presentation environment where a media presentation is to be presented, wherein the real-life media presentation environment is depicted in a virtual reality or an augmented reality, wherein the media presentation environment representation includes multiple hot-spots, each of the hot-spots being associated with a corresponding media presentation device in the real-life media presentation environment, wherein the media presentation environment representation indicates a positional arrangement of a plurality of media presentation devices in the real-life media presentation environment, wherein media presentation devices are selectable via the corresponding hot-spots, and wherein the media presentation environment representation portion provides a preview of media presentation based on a user-selection of one of the media presentation devices; and
    a media presentation movement widget in a media presentation previewing interface,
wherein a media presentation is previewed in an augmented virtual environment depicted in the media presentation environment representation portion, and
wherein the media presentation movement widget controls a flow of the media presentation preview.

29. The computer-readable storage medium according to claim 28, wherein the media presentation preview interface further comprises a media presentation outline portion.

30. The computer-readable storage medium according to claim 28, wherein the media presentation authoring interface controls multiple types of media presentation devices.

31. An integrated presentation authoring and preview system, comprising:
    a camera system that captures live video from a real-life media presentation environment where a media presentation is to be presented;
    a media presentation environment representation that depicts the real-life media presentation environment, wherein the real-life media presentation environment is depicted in a virtual reality or an augmented reality, wherein the media presentation environment representation includes multiple hot-spots, each of the hot-spots being associated with a corresponding media presentation device in the real-life media presentation environment, wherein the media presentation environment representation indicates a positional arrangement of a plurality of physical devices in the real-life media presentation environment, wherein media presentation devices are selectable via the corresponding hot-spots, and wherein the media presentation environment representation provides a preview of a media presentation based on a user-selection of one of the media presentation devices; and a graphical user interface coupled with the camera system or the media presentation environment presentation,
wherein the media presentation environment representation comprises a two-dimensional schematic, a three-dimensional schematic, a three-dimensional pictorial image, and a combination of a two-dimensional schematic, a three-dimensional schematic and a three-dimensional pictorial image.

32. The integrated presentation authoring and preview system according to claim 31, wherein the media presentation environment representation includes multiple types of media presentation devices.

* * * * *